(12) United States Patent
Kim

(10) Patent No.: US 10,520,057 B2
(45) Date of Patent: Dec. 31, 2019

(54) ENGINE MOUNT

(71) Applicants: HYUNDAI MOTOR COMPANY, Seoul (KR); KIA MOTORS CORPORATION, Seoul (KR)

(72) Inventor: Seung Won Kim, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 15/799,546

(22) Filed: Oct. 31, 2017

(65) Prior Publication Data
US 2019/0017568 A1   Jan. 17, 2019

(30) Foreign Application Priority Data

Jul. 14, 2017 (KR) ........................ 10-2017-0089388

(51) Int. Cl.
*F16F 13/10* (2006.01)
*B60K 5/12* (2006.01)

(52) U.S. Cl.
CPC .......... *F16F 13/107* (2013.01); *B60K 5/1208* (2013.01)

(58) Field of Classification Search
CPC .. F16F 9/34; F16F 9/466; F16F 13/007; F16F 9/06; F16F 13/10; F16F 13/107
See application file for complete search history.

(56) References Cited

U.S. PATENT DOCUMENTS

| | | | | |
|---|---|---|---|---|
| 4,391,435 A * | 7/1983 | Pham | ...................... | F16F 13/22 188/298 |
| 4,407,491 A * | 10/1983 | Kunihiro | .................. | F16F 13/20 267/140.13 |
| 4,679,779 A * | 7/1987 | Hodonsky | ............... | F16F 13/08 188/298 |
| 5,029,824 A * | 7/1991 | LaBeau | .................. | F16F 13/106 267/140.13 |
| 6,523,816 B1 * | 2/2003 | Gastineau | ............. | F16F 13/264 267/140.14 |
| 7,448,605 B2 * | 11/2008 | Bretaudeau | ........... | F16F 13/268 267/140.14 |
| 8,998,184 B2 * | 4/2015 | Buttner | ...................... | F16F 9/43 267/122 |
| 2011/0006466 A1 * | 1/2011 | Ichikawa | ............... | F16F 13/105 267/140.13 |

FOREIGN PATENT DOCUMENTS

| | | | | |
|---|---|---|---|---|
| DE | 102016206380 A1 * | 5/2017 | .......... | B60K 5/1208 |
| JP | 2811448 B2 * | 10/1998 | .............. | F16F 13/10 |

OTHER PUBLICATIONS

English version of JP 2811448B2 (Year: 1998).*

* cited by examiner

*Primary Examiner* — Bradley T King
*Assistant Examiner* — Mahbubur Rashid
(74) *Attorney, Agent, or Firm* — Morgan, Lewis & Bockius LLP

(57) ABSTRACT

An engine mount includes a nozzle assembly for partitioning a fluid-filled space into an upper fluid chamber and a lower fluid chamber, wherein the nozzle assembly includes a first flow path to dampen vibrations with a first amplitude and a second flow path to dampen vibrations with a second amplitude greater than the first amplitude, so that the vibrations delivered from an engine can be efficiently reduced.

8 Claims, 7 Drawing Sheets

ENGINE MOUNT

CROSS-REFERENCE TO RELATED APPLICATION

This application is based on and claims the benefit of priority to Korean Patent Application No. 10-2017-0089388, filed on Jul. 14, 2017 with the Korean Intellectual Property Office, the entire disclosures of which is incorporated herein by reference.

TECHNICAL FIELD

The present disclosure relates to an engine mount to dampen vibrations originated from an engine.

BACKGROUND

In general, engines are mounted in vehicles with an aid of engine mounts that reduce vibrations originated from the engines of the vehicles.

The engine mount is to dampen the vibrations delivered from the engine, and there may be a hydraulic engine mount efficiently dealing with various vibrations originated from the engine by partitioning a fluid chamber filled with a fluid into upper and lower parts with a membrane.

SUMMARY

An aspect of the present disclosure is to provide an engine mount including a nozzle assembly partitioning a space filled with a fluid into an upper fluid chamber and a lower fluid chamber, wherein the nozzle assembly comprises a first fluid path to dampen vibrations with a first amplitude and a second fluid path to dampen vibrations with a second amplitude greater than the first amplitude.

The first fluid path may include a venturi tube installed by passing through the nozzle assembly in a vertical direction, the venturi tube comprising a constriction part formed of an elastically deformable material.

The venturi tube may include an upper expansion part with an increasing diameter toward a top portion of the upper extension part and a lower expansion part with an increasing diameter toward a bottom portion of the lower extension part, and a top end of the constriction part is connected to a bottom end of the upper expansion part and a bottom end of the constriction part is connected to a top end of the lower expansion part.

The nozzle assembly may further include an install tube installed by passing through the nozzle assembly in a vertical direction, and wherein the venturi tube is pressed in the install tube.

A space between the venturi tube and the install tube may be filled with air.

The nozzle assembly may include a nozzle housing with the second fluid path arranged along a circumference of the nozzle housing, and a nozzle cover installed above the nozzle housing to cover an open top of the second fluid path, wherein the nozzle cover comprises an upper connection hole to connect an end of the second fluid path and the upper fluid chamber, and the nozzle housing comprises a lower connection hole to connect another end of the second fluid path and the lower fluid chamber.

The venturi tube and the install tube may be installed by passing through the nozzle housing and the nozzle cover, and installed between both ends of the second fluid path.

The nozzle housing may include a first mount hole through which the install tube is installed, and wherein the nozzle cover comprises a second mount hole arranged at a position corresponding to the first mount hole, through which the install tube is installed.

The nozzle assembly may further include a membrane formed of an elastically deformable material and having a form of a circular plate to separate the upper fluid chamber from the lower fluid chamber.

The nozzle housing may have a form of a ring, and includes a seat formed to be stepped from an inner circumferential area of the nozzle housing to have an outer side end of the membrane seated thereon.

BRIEF DESCRIPTION OF THE DRAWINGS

The above and other objects, features and advantages of the present disclosure will become more apparent to those of ordinary skill in the art by describing in detail exemplary embodiments thereof with reference to the accompanying drawings, in which.

DETAILED DESCRIPTION

Figure 1:
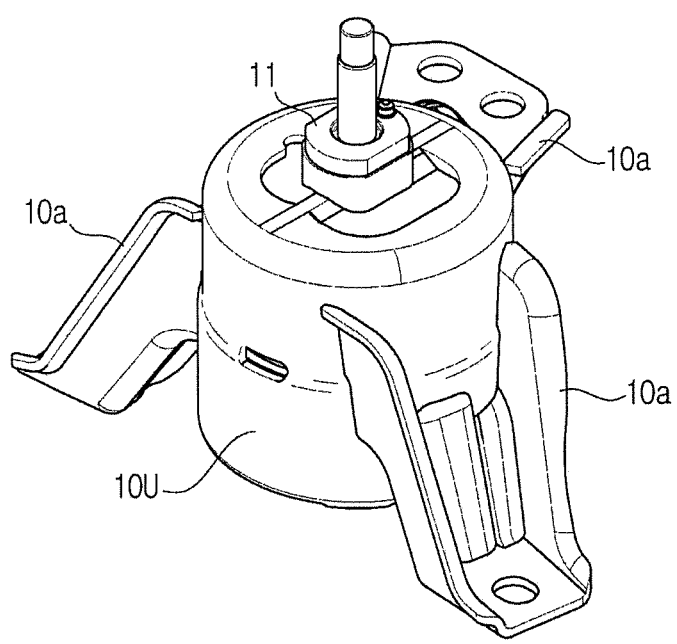
FIG. 1 is a perspective view of an engine mount, according to an embodiment of the present disclosure.

Embodiments and features as described and illustrated in the present disclosure are only preferred examples, and various modifications thereof may also fall within the scope of the disclosure.

Throughout the drawings, like reference numerals refer to like parts or components.

The terminology used herein is for the purpose of describing particular embodiments only and is not intended to limit the present disclosure. It is to be understood that the singular forms "a," "an," and "the" include plural references unless the context clearly dictates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The terms including ordinal numbers like "first" and "second" may be used to explain various components, but the components are not limited by the terms. The terms are only for the purpose of distinguishing a component from another. Thus, a first element, component, region, layer or section discussed below could be termed a second element, component, region, layer or section without departing from the teachings of the present disclosure. Descriptions shall be understood as to include any and all combinations of one or more of the associated listed items when the items are described by using the conjunctive term "and/or," or the like.

The terms "front", "rear", "upper", "lower", "top", and "bottom" as herein used are defined with respect to the drawings, but the terms may not restrict the shape and position of the respective components.

A vehicle herein used refers to a machine that transports people, animals, or cargo from a starting place to a destination. The vehicle may include cars that run on the road or track, ships that travel in the ocean or river, and airplanes that fly in the air with aeromechanics.

The cars that run on the road or track may travel in a desired direction by rotation of at least one wheel, and may include two-wheeled, three-wheeled, or four-wheeled automobiles, cars for construction and machinery, two-wheeled vehicles, motorbikes, or trains that run on the track.

Reference will now be made in detail to embodiments, examples of which are illustrated in the accompanying drawings.

Figure 2:
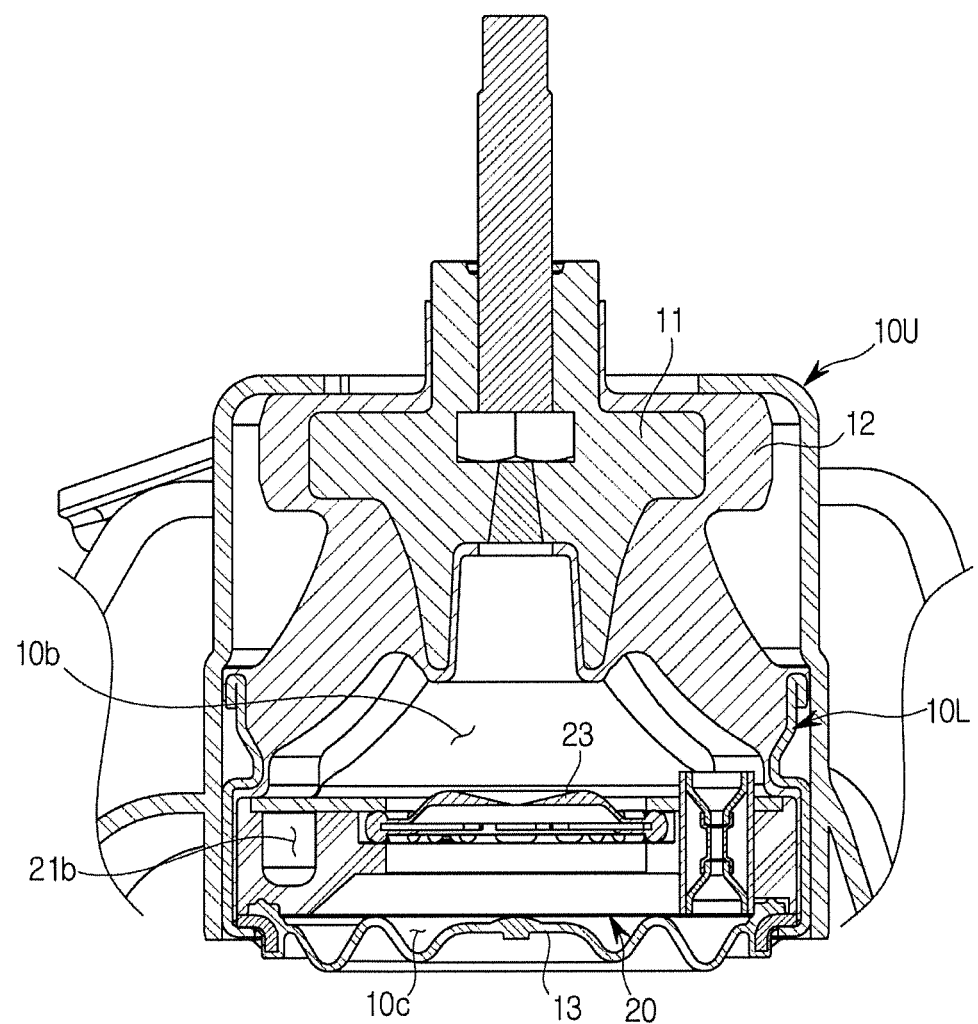
FIG. 2 is a cross-sectional view of an engine mount, according to an embodiment of the present disclosure.

Referring to FIGS. 1 and 2, an engine mount may include an upper case 10U forming the exterior from an engine (not shown), and a lower case 10L receiving a nozzle assembly 20, which will be described later, and combined with a lower part of the upper case 10U.

The upper case 10U may have a substantially cylindrical form with a cavity, and have a plurality of fixing brackets 10a extending integrally from an outer surface of the upper case 10U for the engine mount to be fixed to the vehicle.

An upper part of the upper case 10U includes a core 11 to which vibrations may be delivered, an insulator 12 of an elastic material combined with the core 11, a diaphragm 13 forming a space filled with a fluid together with the insulator 12, and a nozzle assembly 20 partitioning the space formed by the diaphragm 13 into upper and lower parts.

The nozzle assembly 20 partitions the space between the insulator 12 and the diaphragm 13 into the upper and lower parts, such that a space between the insulator 12 and the nozzle assembly 20 forms an upper fluid chamber 10b and a space between the nozzle assembly 20 and the diaphragm 13 forms a lower fluid chamber 10c.

The nozzle assembly 20 may include a first fluid path 24a to dampen vibrations with a first amplitude, and a second fluid path 21b to dampen vibrations with a second amplitude, which is greater than the first amplitude, as shown in FIGS. 3 to 6. The first amplitude is an amplitude of a vibration generated when the engine of the vehicle is at idle, and the second amplitude is an amplitude of a vibration originated from the engine while the vehicle is being driven.

Furthermore, the nozzle assembly 20 may include a nozzle housing 21 and a nozzle cover 22, which form the second fluid path 21b, a membrane 23 separating the upper fluid chamber 10b from the lower fluid chamber 10c, a venturi tube 24 forming the first fluid path 24a, and an install tube 25 in which the venturi tube 24 is installed.

Figure 7:
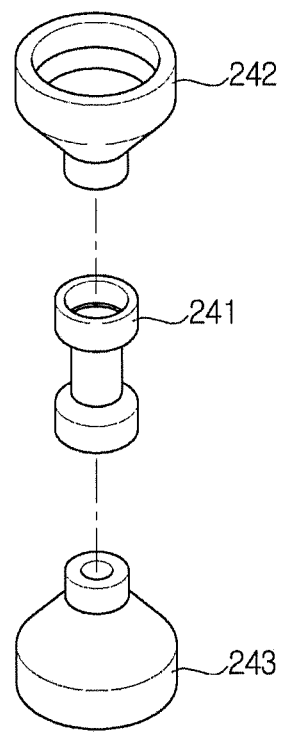
FIG. 7 is a perspective view of a venturi tube applied to an engine mount, according to an embodiment of the present disclosure.

The venturi tube 24 is installed by passing through the nozzle housing 21 and nozzle cover 22 of the nozzle assembly 20. The venturi tube 24 may include, as shown in FIG. 7, a pair of expansion parts 242, 243 and a constriction part 241 between the two expansion parts 242, 243 with a smaller diameter than that of the expansion part 242, 243, and the inside of the venturi tube 24 forms the first fluid path 24a.

The first fluid path 24a is opened or closed depending on the velocity of a fluid passing the first fluid path 24a. For this, the constriction part 241 is formed of an elastically deformable material, such as rubber.

In the meantime, the pair of expansion parts 242, 243 are each formed of a rigid substance stronger than a certain strength. An upper expansion part 242 is arranged above the constriction part 241 with an increasing diameter toward the top portion thereof, and a lower expansion part 243 is arranged under the constriction part 241 with an increasing diameter toward the bottom portion thereof.

An upper end of the constriction part 241 is connected to a bottom end of the upper expansion part 242, and a lower end of the constriction part 241 is connected to a top end of the lower expansion part 243.

Velocity of the fluid is proportional to amplitude of the vibration delivered to the core 11. For example, if the amplitude of the vibration delivered to the core 11 is small, the fluid passes the first fluid path 24a slowly, and if the amplitude of the vibration delivered to the core 11 is large, the fluid passes the first fluid path 24a rapidly.

By the nature of the venturi tube 24, negative pressure acts on the constriction part 241 while the fluid is passing the constriction part 241. The negative pressure acting on the constriction part 241 is proportional to a velocity of the fluid passing the first fluid path 24a, and the velocity of the fluid passing the first fluid path 24a is proportional to the amplitude of vibrations delivered to the core 11.

As described above, since the constriction part 241 is formed of an elastically deformable material, if the negative pressure acts on the constriction part 241, the constriction part 241 is constricted. An extent of constriction of the constriction part 241 is proportional to the negative pressure acting on the constriction part 241. Therefore, the extent of constriction of the constriction part 241 is proportional to the velocity of the fluid passing the first fluid path 24a.

The install tube 25 keeps the upper expansion part 242 and the lower expansion part 243 separated, and the venturi tube 24 is pressed in the install tube 25.

Air fills the space between the venturi tube 24 and the install tube 25, so the space plays a role of an air damper.

The nozzle housing 21 may include the second fluid path 21b, and the nozzle cover 22 may cover the second fluid path 21b of which a top portion is open.

In the embodiment, the nozzle housing 21 and the nozzle cover 22 each is in the shape of a ring, and the second fluid path 21b extends along a circumference of the nozzle housing 21 to form a shape of an arc.

The nozzle cover 22 may include an upper connection hole 22a to connect an end of the second fluid path 21b and the upper fluid chamber 10b, and a first mount hole 22b into which the install tube 25 is inserted. The inner side of the nozzle cover 22 has support from an upper part of the outer side of the membrane 23, thus keeping the membrane 23 installed in a seat 21a, which will be described later.

The nozzle housing 21 includes the seat 21a formed to be stepped from an inner circumferential area of the nozzle housing 21, on which the outer side end of the membrane 23 is seated, a lower connection hole 21c (see FIG. 5) to connect the other end of the second fluid path 21b and the lower fluid chamber 10c, and a second mount hole 21d formed at a position corresponding to the first mount hole 22b, through which the install tube 25 is installed. The first and second mount holes 22b and 21d are formed in the space between both ends of the second fluid path 21b.

The membrane 23 has a form of a circular plate, and is formed of an elastically deformable material, such as rubber to block the inner circumferential area of the nozzle housing 21 and nozzle cover 22 each formed to have a figure of a ring. The outer circumferential area of the membrane 23 is pressed in between the seat 21a and the inner circumferential area of the nozzle cover 22.

A mechanism of the engine mount arranged as described above will now be described.

First, when the vehicle is at idle, vibrations with a first amplitude are delivered from the engine to the engine mount through the core 11.

Figure 3:
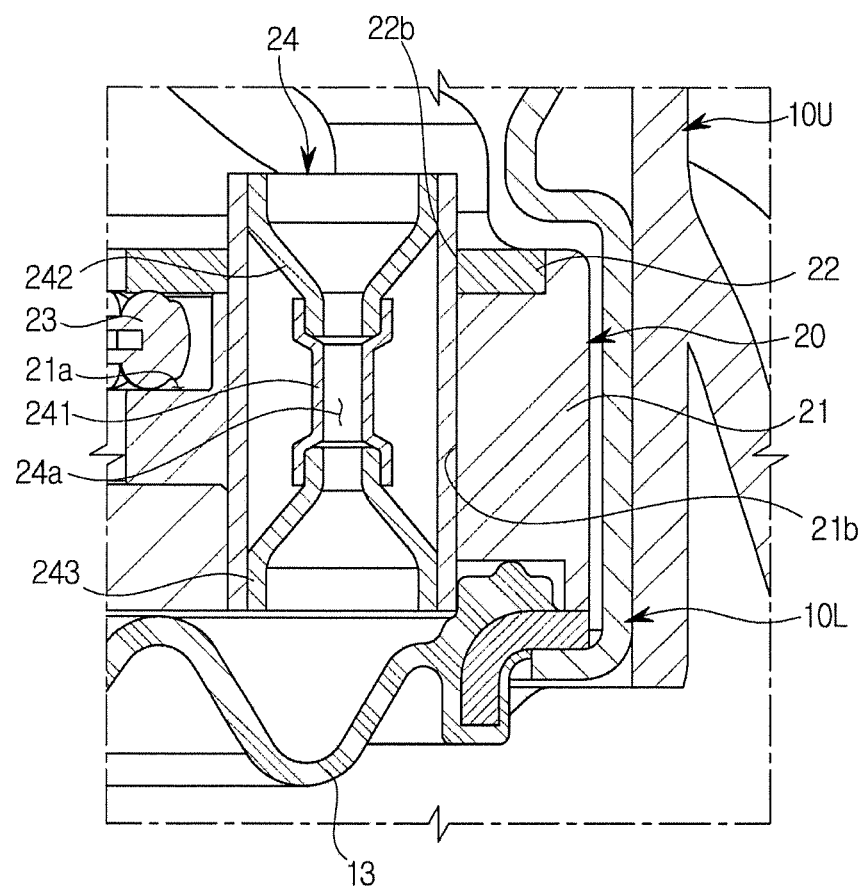
FIGS. 3 and 4 are cross-sectional views illustrating a mechanism of a venturi tube applied to an engine mount, according to an embodiment of the present disclosure.

Once the vibrations with the first amplitude are delivered, the fluid passes the first fluid path 24a at a velocity slower than a preset velocity, so a relatively low negative pressure acts on the constriction part 241. The constriction part 241 is constricted to a limited extent, so the first fluid path 24a is kept open, as shown in FIG. 3. Accordingly, the fluid may continue to flow through the first fluid path 24a.

While the fluid is passing the first fluid path 24a, vibration energy of the fluid is consumed to constrict or restore the constriction part 241. Vibrations with the first amplitude are dampened by the deformation of the constriction part 241.

Next, when the vehicle is being driven, vibrations with a second amplitude greater than the first amplitude are delivered from the engine to the engine mount through the core 11.

Figure 4:
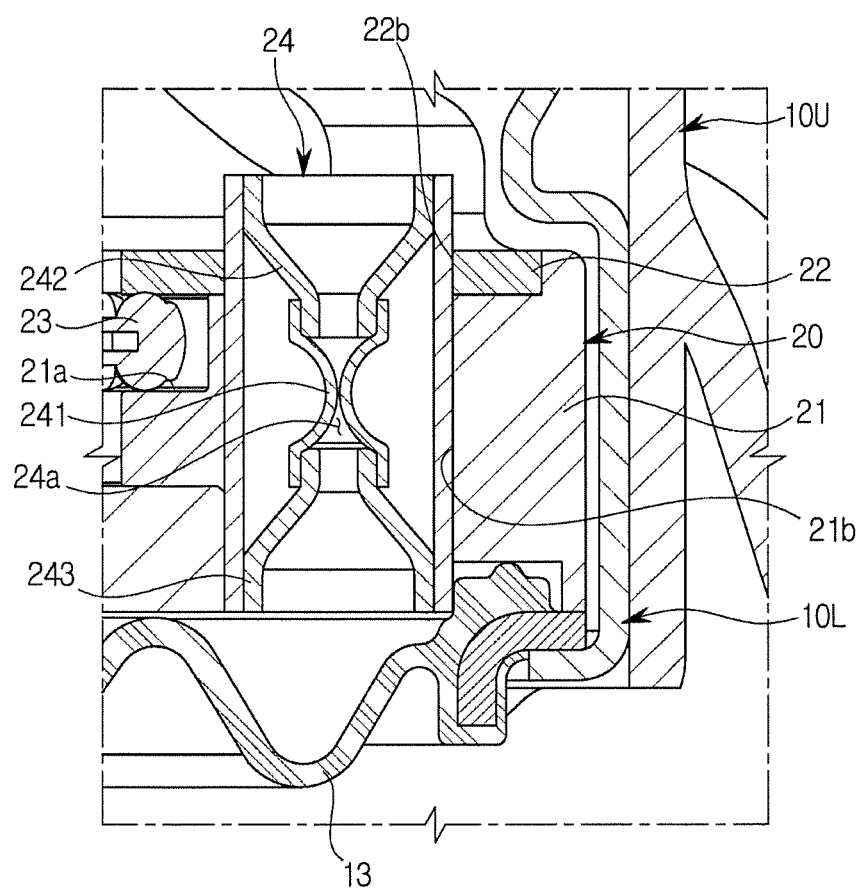
Figure 5:
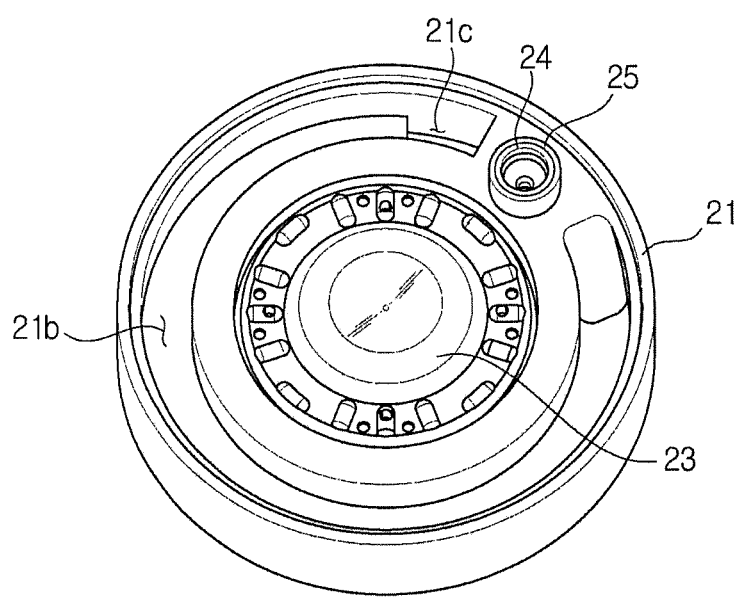
FIG. 5 is a perspective view of a nozzle assembly in an engine mount, according to an embodiment of the present disclosure.
Figure 6:
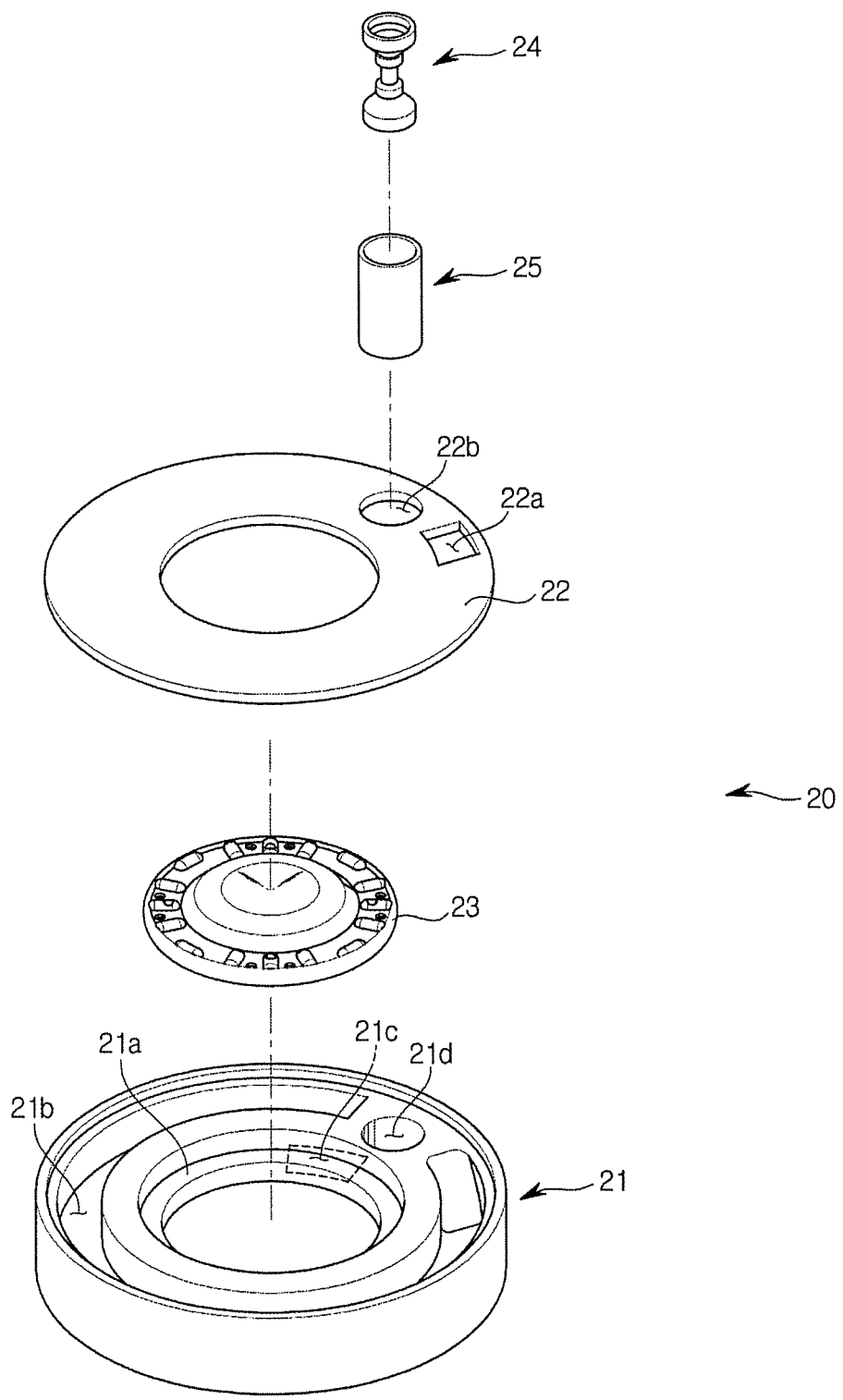
FIG. 6 is a perspective view of a nozzle housing in an engine mount, according to an embodiment of the present disclosure.

Once the vibrations with the second amplitude are delivered, the fluid passes the first fluid path 24a at a velocity faster than a preset velocity, so a relatively high negative pressure acts on the constriction part 241. Accordingly, the constriction part 241 is constricted more than a certain extent, so the first fluid path 24a is closed as shown in FIG. 4 and the fluid flowing through the first fluid path 24a is blocked.

While the first fluid path 24a is blocked, the fluid flows through the second fluid path 21b. Since the second fluid path 21b extends long along the circumference of the nozzle assembly 20, the vibration energy of the fluid passing the second fluid path 21b is dampened by fluid resistance of the second fluid path 21b. In other words, the vibrations with the second amplitude are dampened while the fluid is passing the second fluid path 21b.

As described above, vibrations with the first amplitude generated when the vehicle is at idle are dampened by constriction and restoration of the constriction part 241 formed of an elastic material, and vibrations with the second amplitude generated when the vehicle is being driven are dampened by fluid resistance acting on the fluid passing the second fluid path 21b, thereby efficiently reducing vibrations originated from the engine.

The scope of the present disclosure is not limited to the aforementioned embodiments. It will be understood by those skilled in the art that various changes in form and details may be made therein without departing from the spirit and scope of the disclosure as defined by the appended claims and their equivalents.

What is claimed is:

1. An engine mount comprising:
    a nozzle assembly partitioning a space filled with a fluid into an upper fluid chamber and a lower fluid chamber, wherein the nozzle assembly comprises:
        a first fluid path to dampen vibrations with a first amplitude;
        a second fluid path to dampen vibrations with a second amplitude greater than the first amplitude; and
        an install tube installed by passing through the nozzle assembly in a vertical direction,
    wherein the first fluid path comprises a venturi tube installed in the install tube,
    wherein the venturi tube comprises a constriction part that is made of an elastically deformable material and is constricted according to a velocity of the fluid passing through the venturi tube, and
    wherein a space between the venture tube and the install tube is filled with air.

2. The engine mount of claim 1, wherein the venturi tube comprises an upper expansion part with an increasing diameter toward a top portion of the upper expansion part and a lower expansion part with an increasing diameter toward a bottom portion of the lower expansion part, and
    wherein a top end of the constriction part is connected to a bottom end of the upper expansion part and a bottom end of the constriction part is connected to a top end of the lower expansion part.

3. The engine mount of claim 2,
    wherein the venturi tube is pressed in the install tube.

4. The engine mount of claim 3, wherein the nozzle assembly further comprises:
    a nozzle housing with the second fluid path arranged along a circumference of the nozzle housing; and
    a nozzle cover installed above the nozzle housing to cover an open top of the second fluid path,
    wherein the nozzle cover comprises an upper connection hole to connect an end of the second fluid path and the upper fluid chamber, and the nozzle housing comprises a lower connection hole to connect another end of the second fluid path and the lower fluid chamber.

5. The engine mount of claim 4, wherein the venturi tube and the install tube are installed by passing through the nozzle housing and the nozzle cover, and installed between both ends of the second fluid path.

6. The engine mount of claim 5, wherein the nozzle housing comprises a first mount hole through which the install tube is installed, and
    wherein the nozzle cover comprises a second mount hole arranged at a position corresponding to the first mount hole, through which the install tube is installed.

7. The engine mount of claim 1, wherein the nozzle assembly further comprises a membrane formed of an elastically deformable material and having a form of a circular plate to separate the upper fluid chamber from the lower fluid chamber.

8. The engine mount of claim 7, wherein the nozzle housing has a form of a ring, and includes a seat formed to be stepped from an inner circumferential area of the nozzle housing to have an outer side end of the membrane seated thereon.

* * * * *